US012490030B2

(12) United States Patent
Petersen et al.

(10) Patent No.: US 12,490,030 B2
(45) Date of Patent: Dec. 2, 2025

(54) HEARING AID COMPRISING AN ACTIVATION ELEMENT

(71) Applicant: Oticon A/S, Smørum (DK)

(72) Inventors: Anders Erik Petersen, Smørum (DK); Thorbjørn Pasgaard, Smørum (DK); Kim Mølholm Hejlesen, Smørum (DK); Jesper B. Johansen, Smørum (DK)

(73) Assignee: Oticon A/S, Smørum (DK)

( * ) Notice: Subject to any disclaimer, the term of this patent is extended or adjusted under 35 U.S.C. 154(b) by 144 days.

(21) Appl. No.: 18/099,365

(22) Filed: Jan. 20, 2023

(65) Prior Publication Data

US 2023/0403518 A1 Dec. 14, 2023

(30) Foreign Application Priority Data

Jan. 21, 2022 (EP) .................................... 22152607

(51) Int. Cl.
*H04R 25/00* (2006.01)

(52) U.S. Cl.
CPC ......... *H04R 25/558* (2013.01); *H04R 25/604* (2013.01); *H04R 2225/61* (2013.01)

(58) Field of Classification Search
CPC ..... H04R 25/558; H04R 25/604; H04R 25/30
See application file for complete search history.

(56) References Cited

U.S. PATENT DOCUMENTS

2009/0316921 A1* 12/2009 Lloyd .................... H04R 25/30 381/60
2011/0096036 A1 4/2011 McIntosh et al.
2011/0142269 A1 6/2011 Fretz

FOREIGN PATENT DOCUMENTS

DE 10 2013 210 20 A1 12/2013
FR 2 927 575 A1 8/2009
WO WO 2011/116818 A1 9/2011
WO WO2017/063893 A1 4/2017

OTHER PUBLICATIONS

Extended European Search Report for European Application No. 23152412.5, dated Jun. 19, 2023.
European Communication pursuant to Article 94(3) EPC for European Application No. 23 152 412.5, dated Jun. 24, 2025.

* cited by examiner

*Primary Examiner* — Rasha S Al Aubaidi
(74) *Attorney, Agent, or Firm* — Birch, Stewart, Kolasch & Birch, LLP

(57) ABSTRACT

A hearing aid adapted for being worn by a user comprises a housing configured to enclose components of the hearing aid; a forward audio signal path for receiving an audio signal, processing the audio signal and providing an output signal in dependence of said processed audio signal; a mechanical activation element for controlling functionality of said hearing aid, wherein the mechanical activation element is located on said housing and emits an acoustic signature when activated; and a vibration sensor configured to pick up acoustic vibrations in air or mechanical vibrations of said housing and to provide a sensor signal indicative thereof; and a controller for analyzing said sensor signal for occurrences of said acoustic signature to thereby identify and generate a specific control input for controlling said functionality of the hearing aid. Thereby an improved hearing aid may be provided.

21 Claims, 7 Drawing Sheets

HEARING AID COMPRISING AN ACTIVATION ELEMENT

TECHNICAL FIELD

The present disclosure relates to activation elements in miniature, e.g. wearable, electronic devices, e.g. hearing aids. Electrical buttons and controls can be difficult to integrate—both mechanically and electrically—into small sized electronics like hearing aids. Furthermore, they are prone to reliability and corrosion problems due to the humid environment, where such devices are located (typically in direct contact with a user's body, and hence subject to moisture, sweat, etc.).

SUMMARY

A typical (prior art) button comprises a switch providing contact or no contact between to electrical conductors when the button is operated. Such button is termed an electric button in the following.

The present disclosure proposes a mechanical activation element (e.g. a button) which is designed in such a way that it produces a distinct and repeatable vibration/sound when operated.

WO2017063893A1 describes mechanical push buttons and surfaces of the housing of a device, which are designed in such a way that they have a specific vibration signature over time. Vibrations detected by a vibration sensor caused by a user pressing a button or running their finger along a specific portion of the housing are correlated with predetermined vibration signatures of surfaces/buttons to determine which button or surface of the device a user has interacted with. This detected user interaction is then translated to control the device. For example, if the device is a luminaire the user interaction is translated to light control.

A Hearing Aid:

In the following, the electronic device is exemplified by a hearing aid. Other examples may include other wearable devices, which are in close contact with the user's skin during normal use, e.g. earphones, headsets, earpieces, medical devices, e.g. devices for sensing parameters of the body, etc.

In an aspect of the present application, an electronic device, e.g. a hearing aid adapted for being worn by a user, is provided. The hearing aid comprises a housing configured to enclose components of the hearing aid. The housing may comprise an outer surface facing the environment and an inner surface facing the components of the hearing aid. The hearing aid further comprises a forward audio signal path for receiving an audio signal, processing the audio signal and providing an output signal in dependence of said processed audio signal. The hearing aid further comprises a mechanical activation element for controlling functionality of said hearing aid, wherein the mechanical activation element is located on said housing and emits an acoustic signature when activated. The hearing aid further comprises a vibration sensor configured to pick up acoustic vibrations in air and/or mechanical vibrations of said housing and to provide a sensor signal indicative thereof. The hearing aid may further comprise, a controller for analyzing said sensor signal for occurrences of said acoustic signature to thereby identify and generate a specific control input for controlling said functionality of the hearing aid. The housing and or the mechanical activation element is/are configured allow said mechanical activation element to on the outer surface of the housing to thereby (preferably lasting, such as permanently) attach the mechanical activation element to the housing (without penetrating the housing). The mechanical activation element may e.g. be attached via a click-on-mechanism, or glued, onto to the outer surface of the hearing aid.

Thereby an improved hearing aid may be provided. The placement of the mechanical activation element on an outer surface of a housing of the hearing aid has the advantage of minimizing (avoiding) ingress of water or dust from the environment and/or from the person wearing the hearing aid into the interior of the housing. Thereby a potential source of damage (or ultimately malfunction) of electronic components and electrical connections between them can be removed.

The acoustic signature of a given mechanical activation element (as emitted during activation and/or release) may be recorded in advance of its use. A reference signature for a given mechanical activation element may be recorded in a reference measurement setup, e.g. for a standard placement on a device (e.g. a hearing device, such as a hearing aid) for which it is intended to be mounted. Preferably, a reference signature is recorded for an intended placement of the mechanical activation element on the housing of the hearing aid. A multitude of reference signatures are recorded for a corresponding multitude of intended placements of the mechanical activation element on the housing of the hearing aid. The reference signature(s) may be stored in memory accessible to the controller of the hearing aid. Each of the stored reference measures may be the result of a plurality of measurements, e.g. an average thereof.

The controller may be configured to compare an emitted acoustic signature of the hearing aid (during use) with the reference signature(s) stored in memory. A distance measure (e.g. an Euclidian distance) between the emitted acoustic signature and the reference signature(s) may be determined by the controller. The distance measure may be based on (e.g. discrete samples of) a time domain representation of the acoustic signatures. The distance measure may be based on (e.g. selected frequency ranges, e.g. selected frequency bands, of) a frequency domain representation of the acoustic signatures (e.g. a spectrogram, e.g. values of, e.g. selected or all, time-frequency units representing the spectrogram). The controller may be configured to decide whether the currently emitted acoustic signature originates from the, or one of the, mechanical activation element(s) of the hearing aid of the user in dependence of the distance measure, e.g. in dependence of a criterion related to the distance measure, e.g. that the distance measure is smaller than or equal to a threshold value.

A specific command for controlling the hearing aid (and optionally a contra-lateral hearing aid of a binaural hearing aid system) may be associated with a (e.g. single) detection of the acoustic signature of a specific mechanical activation element. A predefined combination of subsequent detections of the acoustic signature of a specific mechanical activation element may be associated with a different specific command for controlling the hearing aid (and optionally a contra-lateral hearing aid of a binaural hearing aid system).

A further advantage of embodiments of the present disclosure is that the mechanical activation element can be placed on any appropriate place on an outer surface of the housing of the hearing aid (without introducing openings in the housing). The mechanical activation element can be placed 'anywhere' (having an appropriately formed area allowing reception of a bottom (e.g. flat, and/or flexible) surface of the mechanical activation element. The bottom surface of the mechanical activation element (and/or the outer surface of the housing of the hearing aid) may be configured to allow the mechanical activation element to be attached to the hearing aid housing. The outer surface of the housing may comprise one or more specific areas adapted for receiving a mechanical activation element. The specific areas may be indicated on the outer surface of the housing for easy identification of the user or a hearing care professional (HCP)).

In a binaural hearing system, e.g. a binaural hearing aid system, the placement of the mechanical activation element may indicate a left and a right hearing device, the left and right hearing devices being specifically adapted to be located on the left or right ear of the user. The specific adaptation may e.g. either be due to ear specific processing algorithms, or due to ear-specific mechanical features of the left and right hearing devices. The ear-specific mechanical features may e.g. relate to the size or form of a housing of a BTE-part of a hearing device adapted for being located at or behind an ear of the user. The ear-specific mechanical features may e.g. relate to interconnections with other parts of the device, e.g. a cable (e.g. its length or form) and/or a loudspeaker type of an ITE-part adapted for being located in an ear canal of the user.

A binaural hearing system, e.g. a binaural hearing aid system, comprises left and right hearing devices adapted for being located at and/or in left and right ears, respectively of a user. The left and right hearing devices adapted to exchange data, e.g. status or control data, and/or audio data, between them. The binaural hearing system may be configured to provide that only a first one of the left and right hearing devices comprises an activation element (e.g. a mechanical activation element according to the present disclosure). Functionality of the second one of the left and right hearing devices may be controlled in dependence of user-initiated changes of settings (picked up by one or more mechanical activation elements of the first hearing device) received from the first one of the left and right hearing devices via an interaural communication link.

The mechanical activation element (e.g. the bottom surface) may comprise a layer of adhesive material allowing it to be easily attached to the outer surface of the housing of the hearing aid (e.g. after manufacturing, e.g. at a fitting session at a HCP), e.g. according to a user's wish. Acoustic signature(s) of a selected mechanical activation element can e.g. be selected during fitting. To improve reliability of the detection of the acoustic signature, the acoustic signature can be learned by a learning algorithm (e.g. a neural network) by creating (storing) appropriate 'ground truth data' by activating (e.g. by the user while wearing the hearing aid with the applied mechanical activation element) a limited number of times, e.g. less than 10, such as less than or equal to 5 times. The 'ground truth data' can be used to train the learning algorithm (e.g. a small neural network) to be able to identify the acoustic signature of the chosen and mounted mechanical activation element in is final environment (e.g. at an ear of a user), see also section 'Training of a learning algorithm' below.

The hearing aid may be configured to provide a feedback to the user, when a successful activation of the mechanical activation element has been accomplished. A successful activation of the mechanical activation element may be indicated by the initiation of the control process associated with the acoustic signature of the mechanical activation element. The hearing aid may be configured to provide a tactile feedback to the user, when a successful activation has been accomplished. The hearing aid may be configured to provide an audio feedback to the user, when a successful activation has been accomplished.

The mechanical activation element may be configured to provide a tactile feedback to the user, when the mechanical activation element has been activated. The tactile feedback may be an inherent (mechanical) property of the activation element, e.g. of a push button (e.g. like a dome switch, but without the electrical switching function).

The feedback to the user may e.g. be made dependent on a successful detection of an expected acoustic signature by the controller of the electronic device (e.g. the hearing aid) for the activated mechanical activation element in question. The successful detection of the expected acoustic signature by the controller, may e.g. be indicated to the user of the device (e.g. a hearing aid) by a separate indicator. The separate indicator may comprise an acoustic indication via the loudspeaker of the device (e.g. 'Program has been changed', or 'Volume has been changed', etc. as the case may be). The separate indicator may comprise other indicators, e.g. a vibrator or an information signal transmitted to and indicated by (e.g. displayed) a remote control device for the hearing device (e.g. via an APP of a smartphone).

The analysis of the sensor signal for occurrences of the acoustic signature may be performed in the time domain, and/or in the frequency domain. The sensor signal may be provided in the time domain and e.g. transformed to the frequency domain by a Fourier transformation algorithm (e.g. a Discrete Fourier Transform (DFT) algorithm, or a Short Time Fourier Transform (STFT) algorithm, or similar).

A sensor signal in the frequency domain providing a 'spectrogram' (values of the signal at different frequencies over time) may e.g. be analyzed by a learning algorithm, e.g. neural network, configured for that purpose, e.g. a recurrent neural network, e.g. as may be used for keyword detection or similar application. A neural network may be trained to learn the acoustic signature provided by the mechanical activation element (like it can be trained to learn a specific wake-word or command word, e.g. when spoken by a particular user). The training of the neural network may e.g. take place in connection with a fitting session wherein the hearing aid is adapted to the needs of the user (e.g. where parameter settings of processing algorithms customized to the user's needs are applied to the hearing aid of the user). The spectrogram of the sensor signal may be provided by an analysis filter bank based on a time domain sensor signal. The sensor may e.g. be a microphone or a vibration sensor, e.g. an accelerometer.

The vibration sensor may comprise at least one of a microphone, and an acceleration sensor. A microphone may pick up vibrations in air (including such vibrations generated by the mechanical activation element) or mechanical vibrations of said housing (including such vibrations generated by the mechanical activation element). An acceleration sensor may pick up mechanical vibrations of the housing (including such vibrations generated by the activation element). The acoustic signature of vibrations in air and the mechanical vibrations of the housing may (for the same activation) be different. To increase reliability of a detection of the acoustic signature due to vibrations in air (as picked up by a microphone of the hearing aid) as well as the acoustic signature due to mechanical vibrations in the housing (as picked up by an acceleration sensor located in or on said housing).

The forward audio signal path may comprise

- an input transducer for providing an electric input signal representing sound in the environment of the hearing aid;

an audio processor for processing said electric input signal and providing said processed audio signal in dependence thereof;

an output transducer for providing stimuli perceivable as sound to the user based on the processed audio signal.

The vibration sensor may be used in the forward path for capturing sound from the environment. The vibration sensor may be a microphone that is used for picking up sound from the environment as well as for capturing the acoustic signature of the mechanical activation element.

The mechanical activation element may be configured to provide an acoustic signature having its main energy in a specific frequency range. The specific frequency range may be chosen to be a frequency range above common low-frequency movements or impacts of the hearing aid housing, e.g. (intentionally or accidentally) provided by the user.

The mechanical activation element may be configured with a view to providing an acoustic signature emitting an easily identifiable waveform or frequency spectrum.

The acoustic signature may comprise at least two distinctly separable time segments. The acoustic signature may e.g. comprise (at least) two distinctly separable time segments.

The mechanical activation element may be constituted by or comprises a push button. The two distinctly separable time segments of the acoustic signature may originate from a push button. The two distinctly separable time segments may originate from (correspond to) an activation (e.g. push down) and a release of the push button. The activation and release of the mechanical button may have a duration of $\Delta t_{act}$ and $\Delta t_{rel}$, respectively. The time duration ($\Delta t_{pause}$) between the time segments originating from the activation and release, respectively, of the push button may vary depending on user behavior. The same can be the case for the duration of the activation and release time segments.

The two-part signature may be considered as comprising two different acoustic signatures separated by a pause (i.e. a period of relative silence from the mechanical button).

The two-part acoustic signature may e.g. be used to increase confidence of the signature detection, or it may e.g. be used to 'code' the push button activation for short and long duration of the button to thereby indicate different intended functionality.

The controller may be configured to independently detect the at least two distinctly separable time segments. The controller may be configured to only accept the at least two distinctly separable in case both time segments are recognized and together constitute a valid acoustic signature for the push button in question.

The duration of a push (e.g. including an activation part, a pause, and a release part, denoted $\Delta t_{as}=\Delta t_{act}+\Delta t_{pause}+\Delta t_{rel}$) of a mechanical push button may e.g. be of the order of a few milliseconds to 5 seconds. The duration of the release part of may e.g. be shorter than the duration of the activation part. The duration of the activation part, and/or the pause between the activation and the release parts may be used to program the functionality of the button. The duration of an activation part may e.g. be in a range between 0.2 s to 2 s. The duration of a release part may e.g. be in a range between 0.1 s to 1 s.

The push button may comprise a dome adapted to have a height large enough to allow the dome to be sufficiently displaced for it to provide its (activation part of the) acoustic signature, when activated, and small enough to allow it to return to its original position (while providing its (release part) acoustic signature), when released. The dome may be adapted to allow the activation and release of the push button without being (permanently) deformed.

The mechanical activation element, e.g. a button, may be configured to have a resiliency providing a bistable effect whereby it after activation (while in a resting state) returns to its resting state after its release.

The sensor signal representing the acoustic signature may provided as a spectrogram to the controller. The spectrogram may e.g. be provided by an analysis filter bank converting a time-domain sensor signal to a time-frequency representation. The timing of the acoustic signature ($\Delta t_{as}=\Delta t_{act}+\Delta t_{pause}+\Delta t_{rel}$) and the frequency content of the different time segments can be immediately extracted from the spectrogram.

The hearing aid may comprise a multitude of mechanical activation elements, each exhibiting different acoustic signatures and being configured to control different functionality of the hearing aid. The hearing aid may be configured allow the controller to identify the different acoustic signatures.

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver (e.g. based on Bluetooth, or similar technology) for receiving a wireless signal comprising or representing sound and for providing an electric input signal representing said sound.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g, e.g. less than 5 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

The hearing aid, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may further comprise other relevant functionality for the application in question, e.g. compression, noise reduction, feedback control, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

A Mechanical Activation Element Assembly:

In an aspect, a mechanical button assembly is furthermore provided by the present application. The mechanical activation element assembly comprises

- a mechanical activation element for controlling functionality of an electronic device and emitting an acoustic signature when activated;
- a vibration sensor configured to pick up acoustic or mechanical vibrations comprising said acoustic signature and to provide a sensor signal indicative thereof; and
- a controller for analyzing said sensor signal for occurrences of said acoustic signature to thereby identify and generate a specific control input for controlling said functionality of the said electronic device.

The mechanical activation element may be adapted to be attached to an outer surface of a housing of an electronic device.

The vibration sensor and the controller may be adapted to be included in the housing of the electronic device.

The electronic device may be constituted by or comprise a hearing device, such as a hearing aid.

It is intended that some or all of the structural features of the hearing aid described above, in the 'detailed description of embodiments' or in the claims can be combined with embodiments of the assembly.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

The auxiliary device may be constituted by or comprise a fitting system allowing a hearing care professional (or the user) to adapt the hearing aid (e.g. its processing parameters) to the needs of the user (e.g. to compensate for a hearing impairment).

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

The APP (and the hearing aid) may be configured to allow the user to configure the functionality of one or more mechanical buttons of the hearing aid. The acoustic signature of a given mechanical button of the hearing may be configured (via the APP) to associate functionality of the hearing aid, e.g. by choosing among a number of predefined options, e.g. volume control, program selection, take a telephone call, toggle between omni and directional mode of a directional microphone system, etc. The same configuration options may of course be available to a hearing care professional via a fitting system for adapting the hearing aid to the user's needs.

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as hearing aids or headsets, or other wearable electronic devices comprising a user interface.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
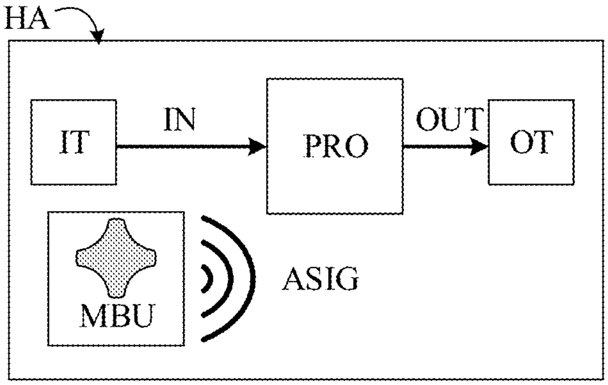
FIG. 1A shows a simplified block diagram for a hearing aid comprising a mechanical button according to a first embodiment of the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present disclosure relates to activation elements in miniature, e.g. wearable, electronic devices, e.g. hearing aids.

The present disclosure proposes a mechanical button which is designed in such a way that it produces a distinct and repeatable vibration/sound (termed 'acoustic or mechanical signature') when operated.

The vibration/sound is being picked up by an accelerometer and/or a microphone (or other suitable sensor) build into the electronic device (e.g. a hearing aid). The mechanical signal should preferably have a mechanical "signature" (acoustic) profile that makes it easy to identify the signal it generates in the vibration sensor (microphone, accelerometer, and/or other sensors) and thereby generate an output stating that the user has activated the (particular) mechanical button. Software for detecting the mechanical signature may e.g. be based on algorithms but it may also be based on machine learning techniques (e.g. a neural network "trained" to pick up the signals from one or more mechanical buttons and provide as an output a specific mechanical button, if the signature of the specific mechanical button has been identified by the neural network).

FIG. 1A shows a simplified block diagram for a hearing aid (HA) comprising a mechanical button (MBU) according to a first embodiment of the present disclosure. The hearing aid is adapted for being worn by a user in contact with the user's body, e.g. at or in an ear. The hearing aid comprises a housing configured to enclose components of the hearing aid. The hearing aid further comprises an input transducer (IT, e.g. a microphone ($M_1$)) for picking up sound from the environment of the hearing aid and providing an electric input signal (IN) representative of the sound. The hearing aid further comprises an audio processor (PRO) for processing the electric input signal and providing a processed signal (OUT) in dependence thereof. The hearing aid further comprises an output transducer (OT, e.g. a loudspeaker) for providing stimuli perceivable as sound to the user in dependence of the processed signal (OUT). The input transducer, the audio processor (PRO), and the output transducer (OT) form part of a forward audio signal path for receiving or providing an audio signal (IN), processing the audio signal (IN), and providing an output signal in dependence of the processed audio signal (OUT). The hearing aid (HA) further comprises a mechanical activation element (MBU), e.g. a button, for controlling functionality of the hearing aid. The mechanical activation element (MBU) is located on the housing of the hearing aid and emits an acoustic signature (ASIG, reproducibly characterizing the mechanical activation element) when activated. The mechanical activation element (MBU) may e.g. be attached to an outer surface of the housing of the hearing aid (and e.g. isolated from the components of the hearing aid enclosed in the housing). The mechanical activation element (MBU) may e.g. be attached via a click-on-mechanism, or glued, onto to an outer surface of the hearing aid. In particular, the mechanical activation element (MBU) is not intended to have any electrical connection to (electrical) components of the hearing aid. The hearing aid (HA) further comprises a vibration sensor configured to pick up acoustic or mechanical vibrations of the environment of the hearing aid or of said housing and to provide a sensor signal indicative thereof. The hearing aid (HA) further comprises a controller for analyzing the sensor signal for occurrences of the acoustic signature (ASIG) to thereby identify and generate a specific control input for controlling the functionality of the hearing aid. In the embodiment of FIG. 1A, the vibration sensor and/or the controller may form part of the audio processor (PRO), or it may comprise the input transducer (IT).

The mechanical activation element (MBU) may be made of any material allowing a reproducible acoustic signature (ASIG, e.g. a 'click') to be generated when the element is activated. The mechanical activation element (MBU) may comprise or be made of a metal. The mechanical activation element (MBU) may comprise or be made of a plastic material. The mechanical activation element (MBU) may be made of a mixture of metal and plastic materials.

A problem of state of the art electric contacts (e.g. buttons on a hearing aid for manual control by the user of functionality of the hearing aid) is that they are a source of incoming moisture into the housing where electronic components are compiled. A consequence thereof may be malfunction, e.g. due to static electricity or corrosion of electrical wiring, etc.

The mechanical activation element (MBU) may be integrated in the housing of the hearing aid.

By using a mechanical activation element (MBU) according to the present disclosure, no electrical contact between the activation element and electronic components of the hearing aid need to exist. Hence the activation element can simply be placed on any appropriate place on an outer surface of the housing of the hearing aid (without introducing openings in the housing). The mechanical activation element (MBU) can be placed 'anywhere', e.g. attached to the hearing aid (e.g. glued on) after manufacturing, e.g. at a fitting session at a hearing care professional (HCP), e.g. according to a user's wish. Acoustic signature(s) of a selected mechanical activation element (MBU) can e.g. be selected during fitting.

The vibration sensor may be or comprise an acceleration sensor (see FIG. 1C), e.g. a 1D, 2D or 3D acceleration sensor. The detection may hence be based on acceleration data for one two or three directions. The vibration sensor may be or comprise a microphone, e.g. a normal microphone of the hearing aid. The vibration sensor may comprise an acceleration sensor and one or more further sensors, e.g. a microphone. Thereby, the confidence level of the detection of a given acoustic signature (ASIG) of a specific mechanical activation element (MBU) may be increased.

Figure 1B:
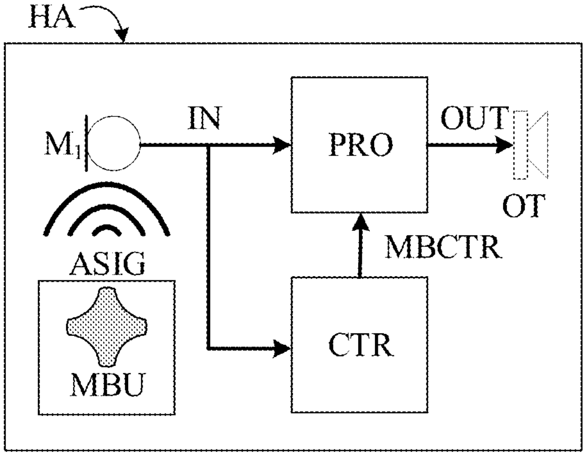
FIG. 1B shows a simplified block diagram for a hearing aid comprising a mechanical button according to a second embodiment of the present disclosure.

FIG. 1B shows a simplified block diagram for a hearing aid comprising a mechanical button according to a second embodiment of the present disclosure. The embodiment of FIG. 1B is similar to the embodiment of FIG. 1A but contains the following differences. In FIG. 1B, the input transducer is a microphone ($M_1$) that is used for simultaneously picking up sound from the environment and for capturing the acoustic signature (ASIG) of the mechanical button (when activated). The hearing aid of FIG. 1B further comprises a a controller (CTR) for analyzing the sensor signal (here the electric input signal (IN) from the microphone ($M_1$)) for occurrences of the acoustic signature to thereby identify and generate a specific control input (MBCTR) to the processor (PRO) for controlling functionality of the hearing aid. The processor (PRO) may comprise a 'signature filter' configured to filter the input signal (IN) to thereby remove the acoustic signature from the input signal (so that it is NOT further processed by the processor and presented to the user (by the output transducer OT). For a given mechanical button, a specific acoustic signature is provided. Based thereon appropriate filter coefficients can be determined and used in the signature filter. Instead of a filter, a neural network or a matched filter trained to recognize the waveform of the specific acoustic signature of the given mechanical button can be used to filter the input signal.

Figure 1C:
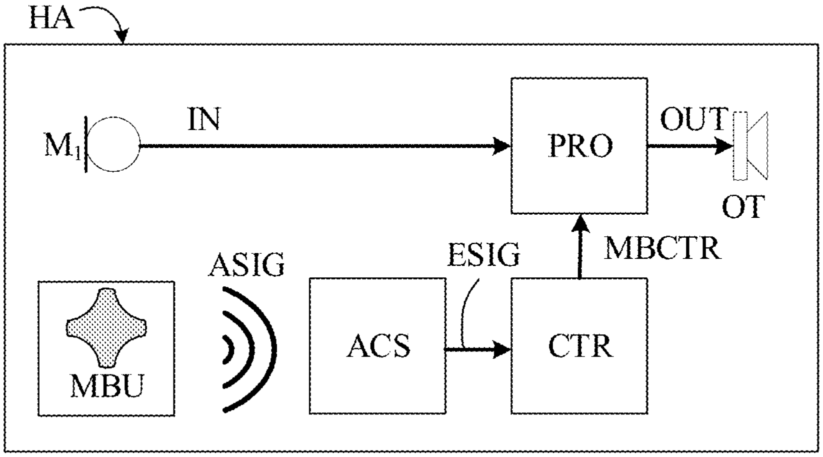
FIG. 1C shows a simplified block diagram for a hearing aid comprising a mechanical button according to a second embodiment of the present disclosure.

The analysis of the sensor signal for occurrences of the acoustic signature may be performed in the time domain, and/or in the frequency domain. The sensor signal may be provided in the time domain and e.g. transformed to the frequency domain by a Fourier transformation algorithm (e.g. a Discrete Fourier Transform (DFT) algorithm, or a Short Time Fourier Transform (STFT) algorithm, or similar). In the embodiment of FIG. 1B, where the input transducer is used as the sensor, such transformation of the input signal may be performed in the input transducer block (IT) or in the processor (PRO). In the embodiment of FIG. 1C, where an accelerometer is used as the sensor, such transformation of the sensor signal may be performed in the accelerometer block (ACS) or in the controller (CTR).

A sensor signal in the frequency domain providing a 'spectrogram' (values of the signal at different frequencies over time) may e.g. be analyzed by a neural network configured for that purpose, e.g. a recurrent neural network, e.g. as may be used for keyword detection or similar application. A neural network may be trained to learn the acoustic signature provided by the mechanical activation element (like it can be trained to learn a specific wake-word or command word, e.g. when spoken by a particular user). The spectrogram of the sensor signal may be provided by an analysis filter bank based on a time domain sensor signal. The sensor may e.g. be a microphone (as in FIG. 1B) or a dedicated vibration sensor (as in FIG. 1C), e.g. an accelerometer.

FIG. 1C shows a simplified block diagram for a hearing aid comprising a mechanical button according to a second embodiment of the present disclosure. FIG. 1C is similar to FIG. 1B, but instead of using the input transducer (IT) to capture the acoustic signature (ASIG) of the mechanical button (MBU), the capture is performed by a dedicated vibration sensor (ACS), e.g. an accelerometer, mechanically connected to the mechanical button (MBU), e.g. via a housing of the hearing aid part, whereon the mechanical button is located. The dedicated vibration sensor (ACS) is configured to capture the vibrations provided by the acoustic signature (ASIG) of the mechanical button (MBU) and provides an electric signal (ESIG) representative thereof. The controller analyses the electric signal (ESIG) from the dedicated vibration sensor (ACS) and provides a mechanical button control signal (MBCTR) in dependence thereof. The mechanical button control signal (MBCTR) is forwarded to the processor and configured to control functionality of the processor (and hence the hearing aid) in case the mechanical button control signal (MBCTR) indicates that the acoustic signature of the mechanical button has been identified (indicating that the mechanical button has been actuated). The acoustic signature of the mechanical button(s) should preferably be different from tapping or other (low frequency) mechanical movements of the hearing aid casing. The controller (CTR) (or the dedicated vibration sensor (ACS) may comprise a filter (e.g. low-pass filter or a band-pass filter) configured to filter the electric signal (ESIG) from the dedicated vibration sensor (ACS) to thereby ease the task of identifying the acoustic signature (ASIG).

The mechanical button can be made in many ways, e.g. as a flexible membrane (known from the existing electrical push buttons) that will be pressed down when activated by the user and thereby produce a sound/vibration to be picked up by the accelerometer/microphone/sensor. An example is illustrated in FIG. 2A, 2B.

Different buttons may have different "signature" sounds/vibrations. In this way multiple buttons can be placed on the hearing instrument (cf. e.g. FIG. 5B) and the signals from the multitude of buttons may be captured by the same vibration sensor (microphone/accelerometer/other sensor).

Figure 2B:
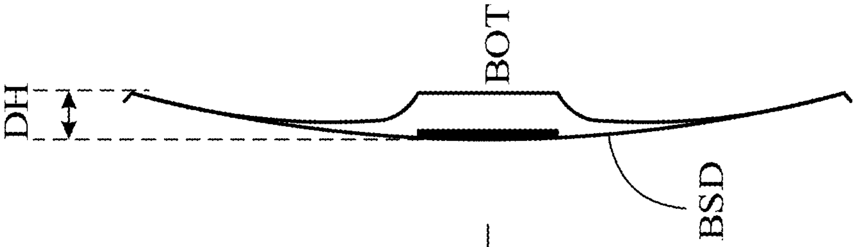
FIG. 2B shows a side view of the mechanical button of FIG. 2A.
Figure 2A:
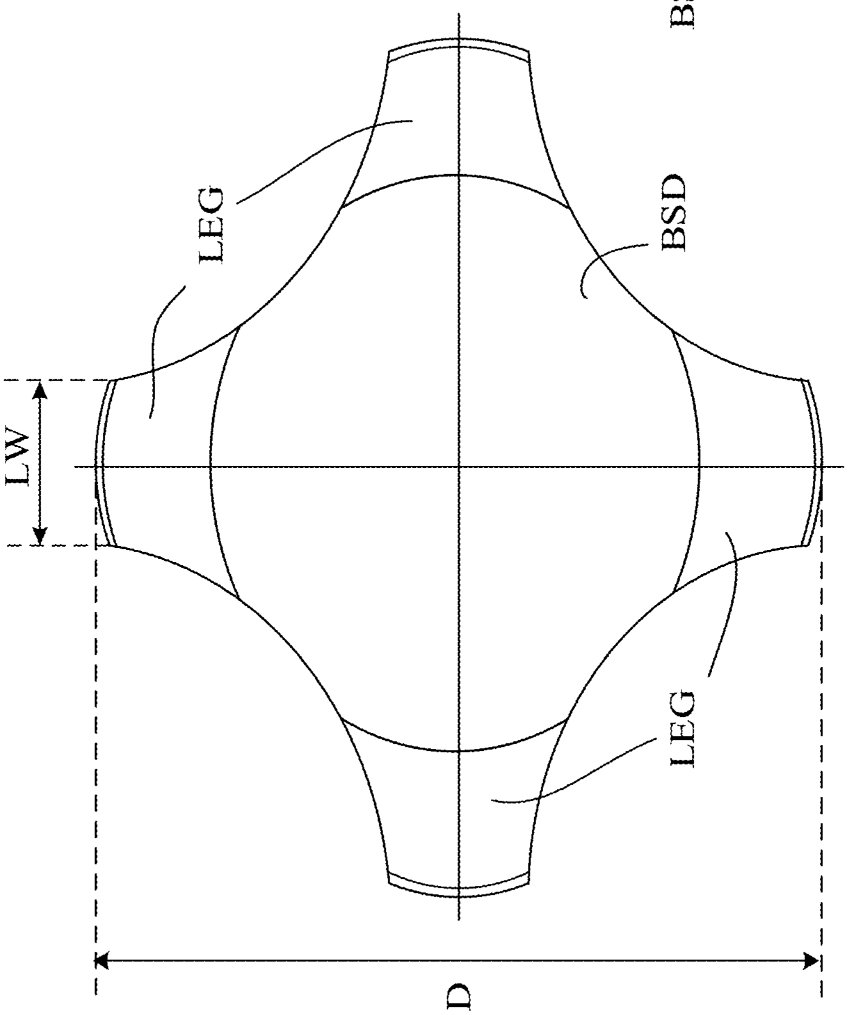
FIG. 2A shows a top view of an exemplary mechanical button according to the present disclosure.

FIG. 2A shows a top view of an exemplary mechanical button according to the present disclosure; and FIG. 2B shows a side view of the mechanical button of FIG. 2A.

The mechanical button comprises a top dome part (BSD) and a bottom part (BOT). The top dome part (BSD) is configured to be pressed towards the bottom part (BOT) by applying an appropriate force to the dome part. The mechanical button is configured to form part of a housing of a device, e.g. a hearing device, so that it is fixed to the housing, e.g. in an appropriate opening of the housing, where the button is fixed to a periphery of the opening or to a surface of the housing to thereby enable a normal function allowing an activation (and subsequent release) of the button.

The mechanical button comprises 4 'legs' (LEG) extending in a symmetrical manner from the centre of the button. Each leg (LEG) has a width dimension (LW) at the periphery of the button. The maximum dimension of the button periphery to periphery of two opposite legs is D (cf. FIG. 2B). In other words, the button can be enclosed by a circle of diameter D. The dimension of D should be so that it allows a finger (e.g. an index finger of a user) to confidently operate the button. The maximum dimension of the button may e.g. be between 5 and 10 mm. The mechanical button need not be circular symmetric. The mechanical button have other forms than circular (e.g. square or rectangular). The button may a form appropriate for the application in question. The height of the button (from the top of the dome part (BSD) to the bottom part (BOT)) is denoted DH in FIG. 2A. The height (DH) should be large enough to allow the dome to be sufficiently displaced for it to provide its acoustic signature (when activated), and small enough to allow it to return to its original position (when released), e.g. without being deformed.

The exemplary mechanical button of FIG. 2A, 2B comprises a bistable metal plate of a conventional electric push button. It may alternatively be made of a plastic material or any other material providing an appropriate resiliency. Preferably, the mechanical button is configured to have a resiliency providing a bistable effect whereby it after activation in a resting state (the activation being e.g. provided by a force applied to the button (a push down) by a user's finger) returns to its resting state after release (e.g. when the user releases the force on the button, e.g. by removing his/her finger). The activation and/or the release may generate an acoustic signal (e.g. a 'click' or other sound) forming part of the acoustic signature of the mechanical button.

The mechanical button may be configured to be mounted on a housing of the hearing aid to be in proximity of the sensor to provide an appropriate sensor signal, when the button is activated/released to thereby allow the acoustic signature to be captured by the sensor (e.g. a microphone and/or an accelerometer).

The sensor may be a movement or vibration sensor (e.g. comprising an accelerometer). The movement or vibration sensor may preferably be mounted on or in the housing of the hearing aid to be in mechanical contact with the sensor.

In case the sensor comprises a microphone, such mechanical contact with the sensor is not mandatory.

The mechanical button may be integrated with the housing of the hearing aid. The mechanical button may be located on the housing to be easily accessible (and activated) for the user, e.g. to allow the user to activate and release the button while the hearing aid is mounted on the head of the user in a normal position.

Alternatively, the mechanical button may be provided as a separate unit configured to be mounted in a predefined hole (opening) in the housing.

Alternatively, the mechanical button may be provided as a separate unit configured to be applied to the housing (e.g. as a 'sticker', e.g. having a face that may be fixed to a surface of the housing, e.g. by glue (e.g. pre-applied to the button (or to the housing, e.g. covered by a removable (e.g. paper) cover). The separate mechanical button may be mounted anywhere on the housing of the hearing aid, e.g. according to the user's wishes, e.g. asymmetrically on the side of the hearing aid housing. The mounting (and subsequent configuration) of the mechanical button may e.g. be performed by a hearing care professional (HCP), e.g. during fitting of the hearing aid to the user's needs.

Figure 3A:
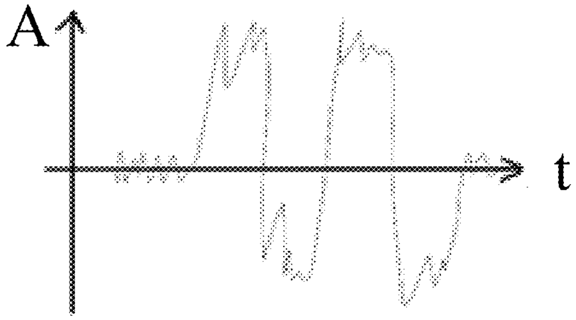
FIG. 3A shows a first exemplary acoustic signature of a mechanical button according to the present disclosure.
Figure 3B:
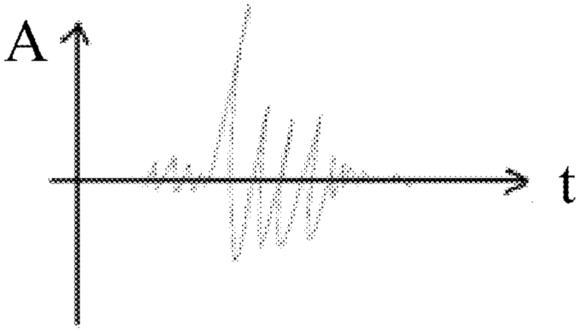
FIG. 3B shows a second exemplary acoustic signature of a mechanical button according to the present disclosure, FIG. 4 schematically shows an exemplary two-part acoustic signature of a mechanical button according to the present disclosure.

The mechanical signature may be analysed and identified from an electrical representation thereof as e.g. provided by an acoustic or vibration sensor, e.g. a microphone or an acceleration sensor (e.g. an accelerometer). FIG. 3A, 3B shows respective waveforms of time-domain signals (amplitude (A) vs. time (t)) for two mechanical buttons.

FIGS. 3A and 3B shows first and second exemplary acoustic signatures of first and second mechanical buttons according to the present disclosure.

The signatures may e.g. be analysed in the time domain to directly identify a given characteristic waveform. The time domain waveforms of the signatures may be converted to the transform domain (e.g. the frequency domain) and e.g. be analysed in the frequency domain. A specific frequency content of the waveform of the signature may thereby be easily identified. In case a microphone is used as sensor for the mechanical signature (cf. e.g. FIG. 1B), an output from an existing (analysis) filter bank of the audio forward path of the hearing instrument may be used as inputs to the signature analyser (cf. CTR in FIG. 1A-C). The output of the filter bank fed to the signature analyse may e.g. be specific frequency bands thereof, where the frequency domain signature is known to be located.

The chosen mechanical signature(s) of the mechanical button(s) should preferably be different from tapping or other (low frequency) mechanical movements of the hearing aid casing.

A mechanical button will give a lot more design freedom when it comes to placement of the button:

It can be placed in a fixed position replacing traditional buttons.

It can be used as an optional button which is only mounted if required by the user of the hearing instrument.

It can be used as a "sticker" that can be placed literally anywhere on the hearing instrument according to user preferences.

Figure 5A:
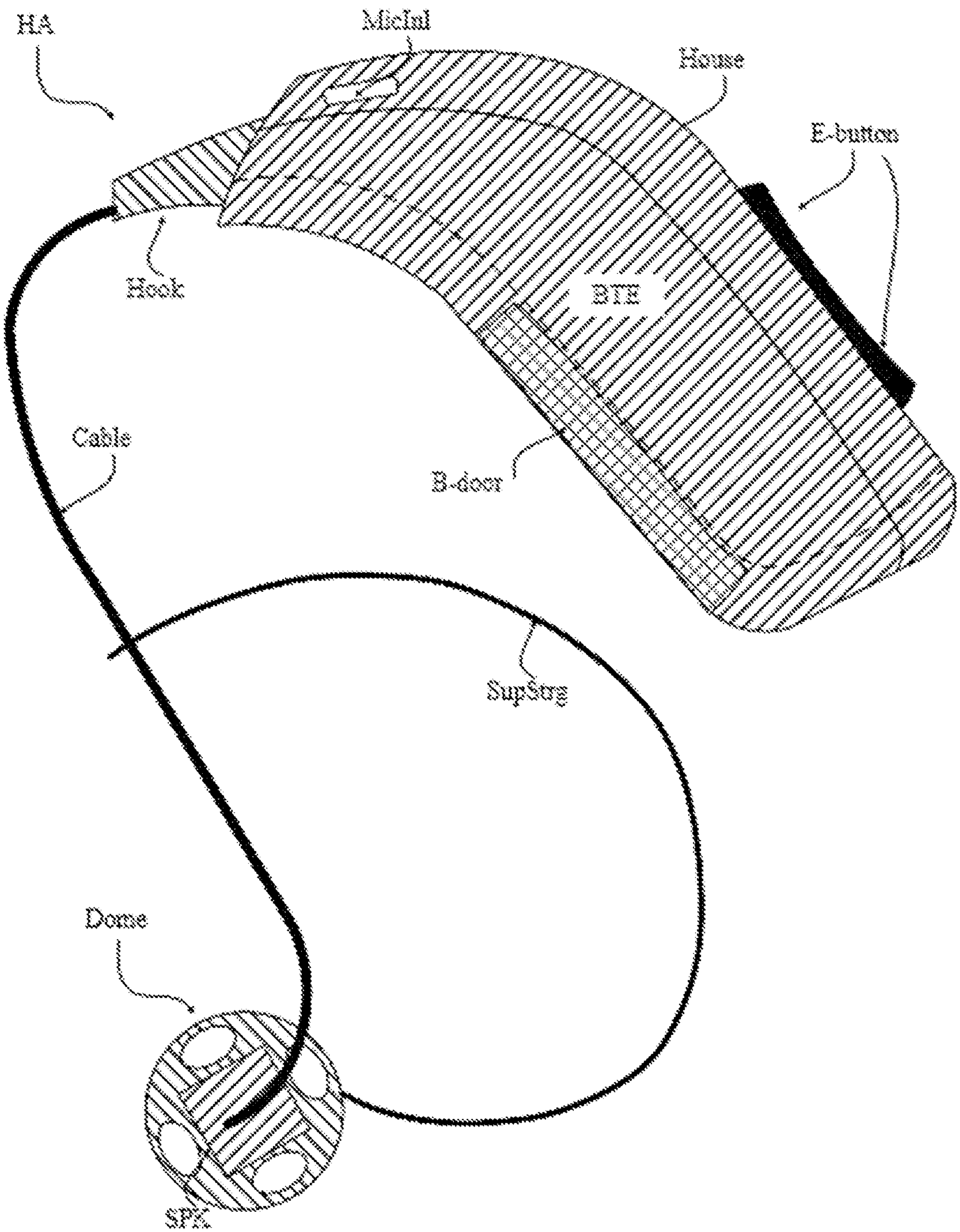
FIG. 5A shows a side view of a prior art hearing aid comprising an electric button.
Figure 5B:
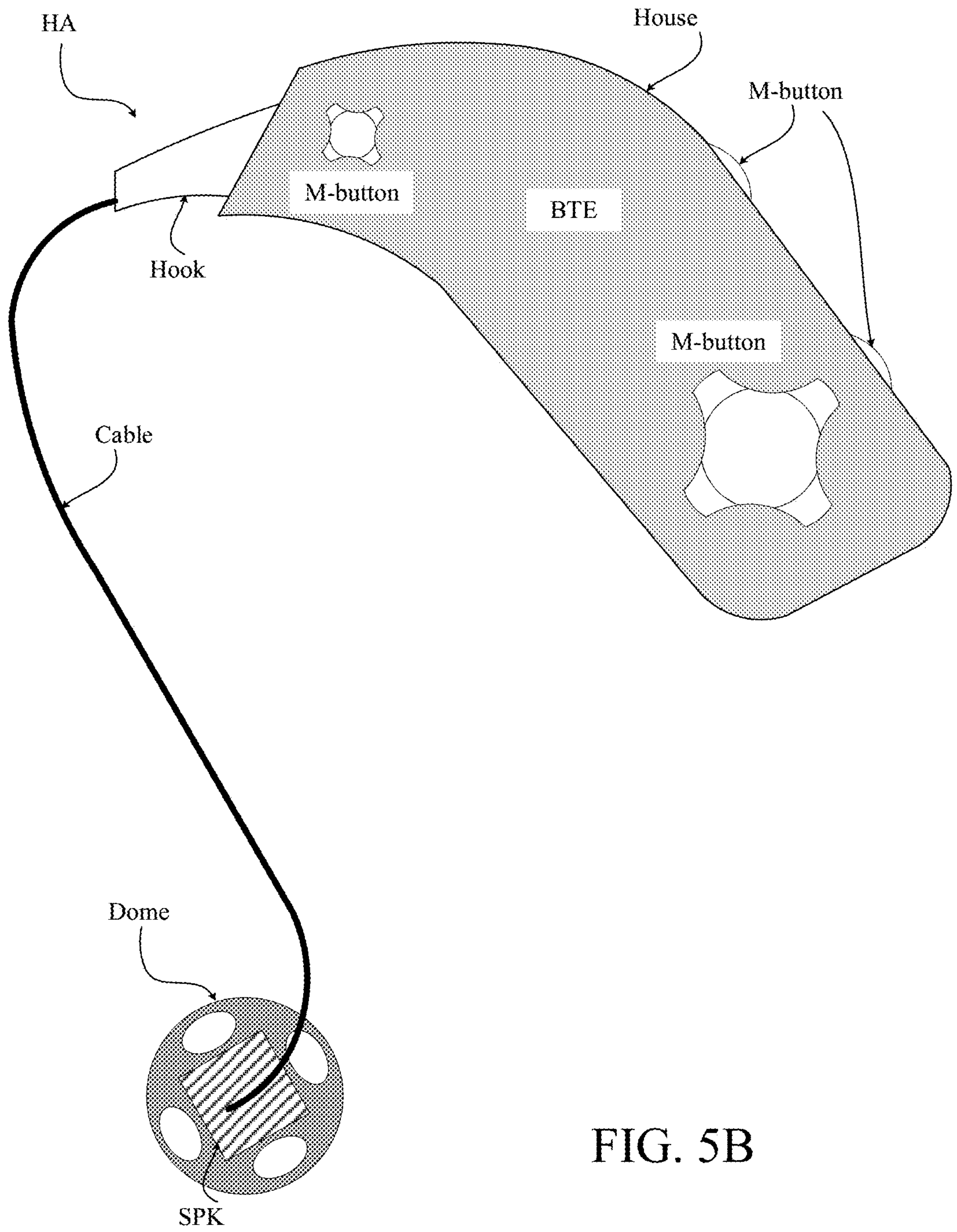
FIG. 5B shows a side view of an exemplary hearing aid comprising a number of mechanical buttons according to the present disclosure, and FIG. 6A schematically shows a side view of a mechanical activation element in form of a mechanical button comprising a dome-like activation element in its released state according to the present disclosure.

An example of 'flexible placement' of mechanical buttons on the housing of a (BTE-part) of a hearing aid is illustrated in FIG. 5B.

The mechanical button may further include sliding motions as well a more traditional vertical press. In this case the surface may be configured to have a certain structure that produces the mechanical "signature" signal when a finger or another object is sliding over the surface.

Figure 4:
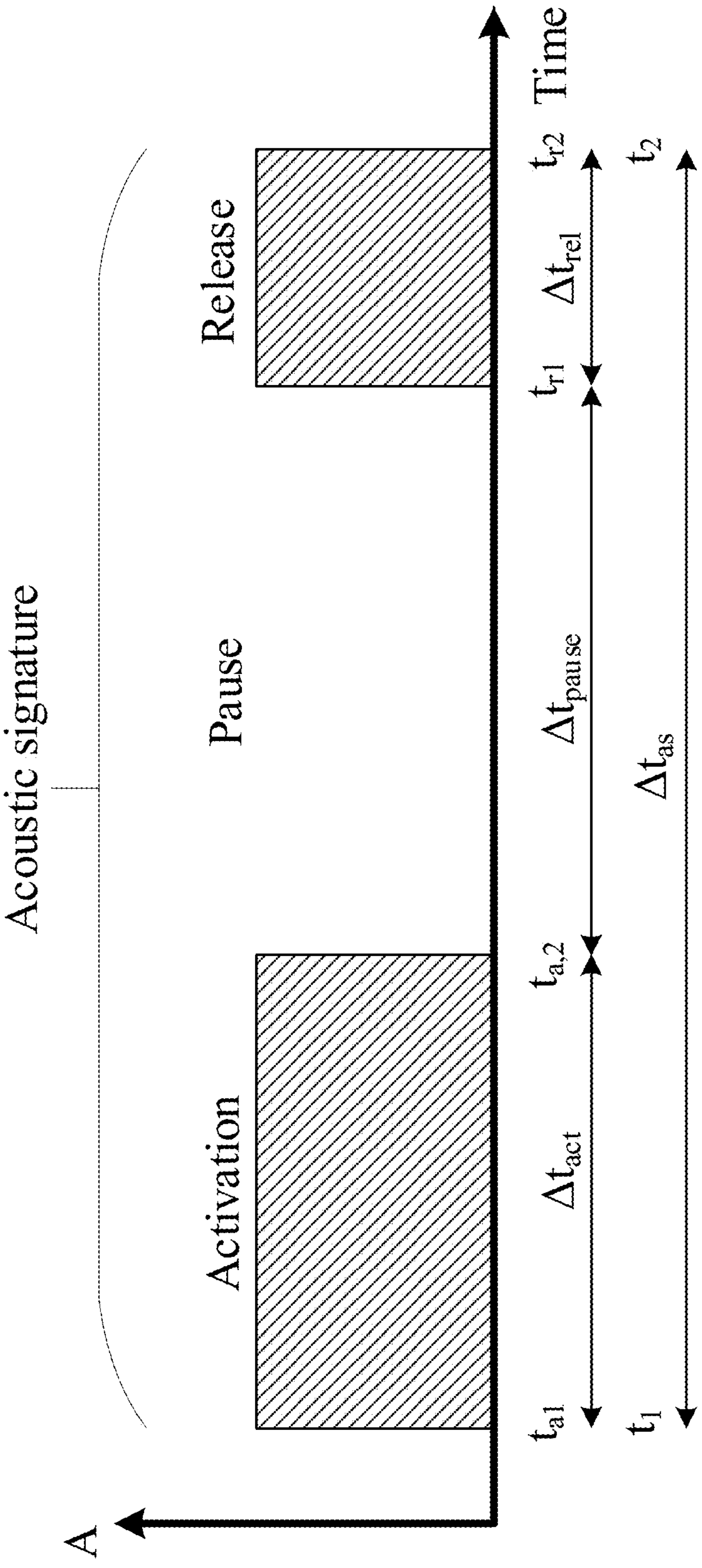

An advantage of such 'mechanical slider button' is that it may provide a repetitive signal, e.g. as illustrated in FIG. 4 (where e.g. the on-pause-off-signal is repeated).

FIG. 4 shows an exemplary two-part acoustic signature of a mechanical button according to the present disclosure. The acoustic signature may e.g. comprise (at least) two distinctly separable time segments as schematically illustrated in FIG. 4. The two distinctly separable time segments may originate from a push button. The two distinctly separable time segments may originate from (correspond to) an activation (e.g. push down) and a release of the push button (denoted 'Activation' and 'Release', respectively in FIG. 4). The activation and release of the mechanical button may have a duration of $\Delta t_{act}$ and $\Delta t_{rel}$, respectively. The time duration ($\Delta t_{pause}$) between the time segments originating from the activation and release, respectively, of the push button (denoted 'Pause' in FIG. 4) may vary depending on user behavior. The same can be the case for the duration of the activation and release time segments.

The two-part acoustic signature may e.g. be used to increase confidence of the signature detection, or it may e.g. be used to 'code' the push button activation for short and long duration of the button to thereby indicate different intended functionality.

The duration of a push (e.g. including an activation part, a pause, and a release part, denoted $\Delta t_{as}=\Delta t_{act}+\Delta t_{pause}+\Delta t_{rel}$) of a mechanical push button may e.g. be of the order of a few milliseconds to 5 seconds. The duration of the release part of may e.g. be shorter than the duration of the activation part. The duration of the activation part, and/or the pause between the activation and the release parts may be used to program the functionality of the button. The duration of an activation part may e.g. be in a range between 0.2 s to 2 s. The duration of a release part may e.g. be in a range between 0.1 s to 1 s.

In case the sensor signal representing the acoustic signature is provided as a spectrogram (e.g. by an analysis filter bank converting a time-domain sensor signal to a time-frequency representation), the timing of the acoustic signature ($\Delta t_{as}=\Delta t_{act}+\Delta t_{pause}+\Delta t_{rel}$) and the frequency content of the different time segments can be immediately extracted from the spectrogram.

The two-part signature may be considered as comprising two different acoustic signatures separated by a pause (i.e. a period of relative silence from the mechanical button).

FIG. 5A shows a side view of a prior art hearing aid (HA) comprising an electric button (E-button), e.g. implementing a toggle switch. The hearing aid (HA) comprises a BTE-part (BTE) adapted to be located at or behind an er (pinna) of the user. The BTE-part comprises a housing (House) wherein components of the hearing aid are enclosed, and whereon a user interface in form of the electric button (E-BUT) is located. The button is located in an opening of the housing and electrically connected to electronic components of the hearing aid located in the housing of the BTE-part. The housing encloses a battery, which is accessible via a battery door (B-door), optionally locked by a locking mechanism to the user, e.g. in case the battery is rechargeable. The BTE-part may e.g. comprise one or more microphones (typically at least two). A microphone inlet (MicInl) is indicated in the top part of the housing. The components of the BTE-part are electrically connected to a loudspeaker (SPK) configured to be located in an ear canal of the user via an electric cable (Cable) from the BTE-part (via a plastic guide (Hook) connected to the housing of the BTE-part). The loudspeaker is mechanically connected to a (e.g. flexible) dome (Dome), e.g. comprising holes allowing air to be exchanged with the environment. The dome (Dome) is configured to guide (e.g. centring) the loudspeaker (SPK) in the ear canal. The hearing aid further comprises a semi-rigid support string (SupStrg) mechanically connected to the dome/loudspeaker and configured to support mounting of the hearing aid in the ear (pinna) of the user. The hearing aid shown in FIGS. 5A (and 5B) is of the 'receiver in the ear' style but may be of any style comprising a user interface, e.g. in the form of one or more buttons for controlling functionality (e.g. volume or program selection) of the hearing aid. The prior art electric button (E-BUT) of the hearing aid of FIG. 5A has the disadvantage of being susceptible to humidity that may hamper the function of the electric button as well as other electric functionality of the hearing aid (e.g. due to corrosion or unintentional shortcuts in the electric circuitry of the hearing aid).

FIG. 5B shows a side view of an exemplary hearing aid (HA) comprising a number of mechanical buttons according to the present disclosure. Apart from the substitution of the electric button(s) (E-button) of the embodiment of FIG. 5A with mechanical buttons (M-button) in the embodiment of FIG. 5B, the embodiment of FIG. 5B may comprise the same elements as described in connection with FIG. 5A. In the embodiment of FIG. 5B, the hearing aid comprises a multitude of mechanical buttons (M-button) of various sizes (and e.g. having different acoustic signatures). In the embodiment of FIG. 5B, the hearing aid (here, the housing (House) of the BTE-part (BTE)) comprises four mechanical buttons (M-button), two on the 'broad' side configured to be parallel to the head of the user facing the environment, when properly mounted, and two on the 'narrow' side facing the rear of the user, when properly mounted. The mechanical buttons may be customized in size to the available space on the surfaces where they are mounted, e.g. having larger or smaller maximum dimensions in dependence of the available surface space. In the view of FIG. 5B, the mechanical button located in the lower part of the housing of the BTE-part is larger than the mechanical button located in the top part. Thereby the ease of use of the buttons (size) may e.g. be correlated to the importance (e.g. the expected frequency of use), e.g. according to the user's wishes. Preferably, the mechanical buttons have different acoustic signatures to allow the hearing aid to associate different functionalities to each button. The mechanical buttons according to the present disclosure have the advantage that they don't need to be in electrical contact with any parts of the hearing aid (so that they enable a hermetically closed housing of the hearing aid). Further they can be easily placed on the housing of the hearing aid, e.g. according to customer wishes. Different sized of the buttons can be used according to the available space on the surface of the housing (or in dependence of other criteria, e.g. dexterity of the user).

In FIG. 5A, 5B the hearing aid is a BTE-style hearing aid comprising a BTE-part and a part for being located in the ear canal of the user). The hearing aid may, however, be of any other style, e.g. comprising or being constituted by an ITE-part adapted for being located fully or partially in the ear canal of the user.

Figure 6A:
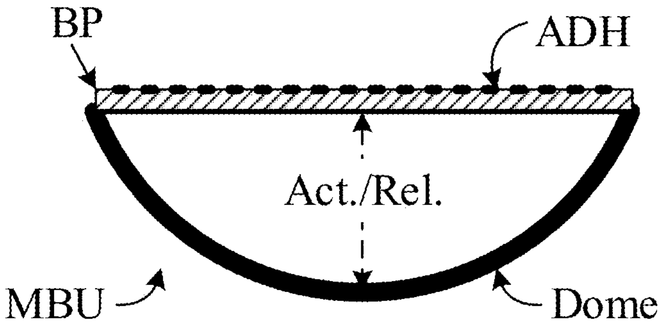
FIG. 6B schematically shows a side view of a mechanical button as shown in FIG. 6A in its activated state.
FIG. 6C schematically shows a side view of a mechanical button as shown in FIG. 6A in its released state.

FIG. 6A schematically shows a side view of a mechanical activation element in form of a mechanical button comprising a dome-like mechanical activation element (MBU) in its resting state according to the present disclosure. The dome-like mechanical activation element (MBU) comprises a bottom part (BP) and an upper part comprising a dome-like structure of a resilient material allowing it to be deformed ('activation') by application of small force, e.g. by a finger of a person, and to return ('release') to a resting state, when the force is removed from the dome. By activation and release of the dome, an acoustic signature of the mechanical activation element (MBU) is created. Thereby a two-part signature (Signature-A (activation), Signature-R (release) is provided. The two-part signature may be considered as comprising two different acoustic signatures separated by a pause (i.e. a period of relative silence from the mechanical button), or one total acoustic signature, or only one (activation or release) of the two-part signatures may be considered for identification and control of the electronic device in question, according to the particular design.

A bottom surface of a bottom part (BP) the dome like mechanical activation element comprises a layer of adhesive material (ADH, indicated by a dashed layer on the outer (bottom) surface of the bottom part of the button) allowing it to be easily attached to the outer surface of the housing of the hearing aid (e.g. after manufacturing, e.g. at a fitting session at a HCP), e.g. according to a user's wish and/or to be able to differentiate between a left and a right hearing instrument of a binaural hearing aid system.

Figure 6B:
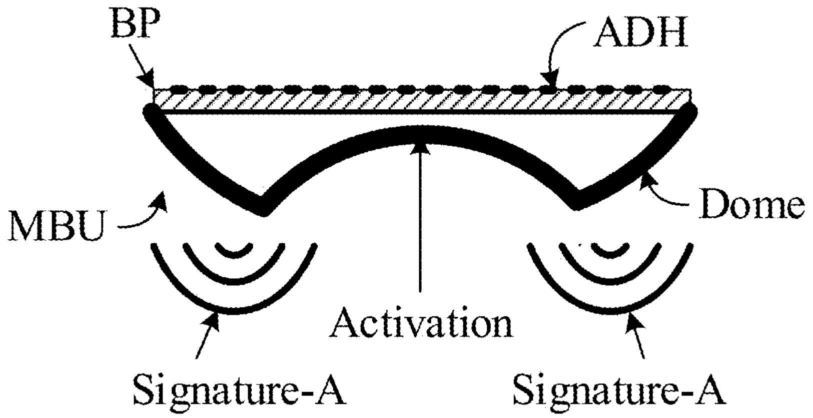

FIG. 6B schematically shows a side view of a mechanical button as shown in FIG. 6A in its activated state where the dome is exposed to a force (e.g. by a finger) in a direction of the bottom part of the mechanical activation element (MBU) (cf. arrow denoted 'Activation'). Thereby an activation acoustic signature (Signature-A) is created. The acoustic signature (Signature-A) may comprise vibrations in air and/or vibrations in the carrier to which the mechanical button is attached (here e.g. the housing of a hearing aid).

Figure 6C:
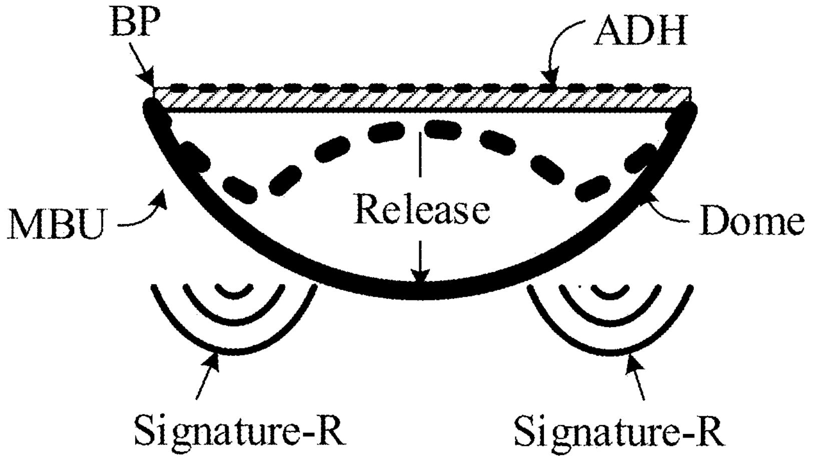

FIG. 6C schematically shows a side view of a mechanical button as shown in FIG. 6A in its resting state. FIG. 6C illustrates the release of the dome after its activation (as illustrated in FIG. 6B). In FIG. 6C the release process is illustrated by indicating (by the dashed outline) the start state of the dome in its deformed (activated) state and its return to its resting state when the force applied to activate the mechanical button is removed (cf. arrow denoted 'Release'). Thereby a release acoustic signature (Signature-R) is created. The acoustic signature (Signature-R) may comprise vibrations in air and/or vibrations in the carrier to which the mechanical button is attached (here e.g. the housing of a hearing aid).

Instead of the dome creating the acoustic signatures (Signature-A, Signature-R), such signatures may be created by a membrane activated and released by activating and releasing the dome (cf. FIG. 2A, 2B). The membrane may be included in the bottom part of the mechanical button such that it is free to vibrate when the force applied to the dome during activation is transferred from the dome to the membrane and during release when the force is removed from the dome (and thus from the membrane).

The mechanical activation element may be configured to provide a tactile feedback to the user, when a successful activation has been accomplished. The tactile feedback may be an inherent (mechanical) property of the activation element, e.g. of a push button (e.g. like a dome switch, but without the electrical switching function). It may, however, be made dependent on a successful detection of an expected acoustic signature by the controller of the electronic device (e.g. the hearing aid) for the activated mechanical activation element in question. The successful detection of the expected acoustic signature by the controller, may e.g. be indicated to the user of the device (e.g. a hearing aid) by a separate indicator. The separate indicator may comprise an acoustic indication via the loudspeaker of the device (e.g. 'Program has been changed', or 'Volume has been changed', etc. as the case may be).

Training of a Learning Algorithm:

The learning algorithm, e.g. a neural network, may e.g. be configured to receive data from the vibration sensor (e.g. the sensor signal), e.g. a microphone or a movement sensor, e.g. an accelerometer (or from both), as input features (or otherwise processed (e.g. filtered or down-sampled versions) of such data). The learning algorithm, e.g. a neural network, may be trained on examples of data representing the acoustic signature of one or more mechanical activation elements ('reference signatures'), e.g. obtained, when the electronic device in question, e.g. a hearing aid, is correctly mounted on the user (or on another natural person or on a model of a person, e.g. a HATS model).

The input data (e.g. an input feature vector) to the neural network may e.g. comprise or be constitute by data from one or more movement sensors, e.g. accelerometers (and/or gyroscopes and/or magnetometers, etc.).

The input data (e.g. an input feature vector) of the neural network may be constituted by or comprise data for a given time instance (n, e.g. 'now'). The input data may e.g. be constituted by or comprise data for a the given time instance (n) and a number (N) of previous time instances. The latter may be advantageous depending on the type of neural network used (in particular for feed forward-type or convolutional-type neural networks). The 'history' of the data represented by the (N) previous time instances may be included in the neural network, e.g. in a recurrent-type neural network, e.g. comprising a GRU. An input vector may comprise the expected time duration of data from one or more vibration sensors representing a full (or partial acoustic signature (e.g. an activation part, or a release part). Alternatively, the (time-) history of the data may be included by low-pass filtering the data before entering the neural network. Thereby the number of computations performed by the neural network can be decreased.

The output of the neural network may e.g. comprise a binaural indication of whether a current input vector corresponds to a specific acoustic signature of a mechanical activation element of the hearing aid. Instead of a binaural indication, the output of the neural network may e.g. comprise a probability that a current input vector corresponds to a specific acoustic signature of a mechanical activation element of the hearing aid. In case the hearing aid comprises a plurality ($N_{MAE}$) of different mechanical activation elements, the output of the neural network may comprise separate probabilities that a current input vector corresponds to each of the plurality ($N_{MAE}$) of different specific acoustic signatures of the mechanical activation elements of the hearing aid.

The neural network may comprise a multitude of layers, e.g. an input layer and an output layer and a number of layers (termed 'hidden' layers) in between. Depending on the number of hidden layers, the neural network may be termed a 'deep' neural network. The number of hidden layers may e.g. be smaller than or equal to 10, such as smaller than or equal to 5.

Different Layers may represent different neural network types, e.g. one or more layers implemented as recurrent neural network (e.g. GRUs) and one or more layers implemented as feed forward or convolutional neural networks.

The number of parameters characterizing the functionality of the nodes of the neural network (e.g. their weight, bias and/or non-linearity) may be limited to the application in question. The number of parameters may e.g. be smaller than 10,000, e.g. of the order of 500-5000.

The number of input nodes of the neural network may e.g. be smaller than or equal to 200 or 100, such as smaller than or equal to 50.

The training examples may be obtained from a database of 'ground truth data' comprising acoustic signatures of one or more mechanical elements (termed reference signatures). A reference signature for a given mechanical activation element may be recorded in a reference measurement setup, e.g. for a standard placement on a device (e.g. a hearing device, such as a hearing aid) for which it is intended to be mounted. Preferably, a reference signature is recorded for an intended placement of a given mechanical activation element on the housing of the hearing aid. Preferably a reference signature is recorded while the hearing aid is correctly mounted on the user (or on another natural person or on a model of a person, e.g. a HATS model). A multitude of reference signatures are recorded for a corresponding multitude of intended placements of the given mechanical activation element on the housing of the hearing aid. This may be repeated for different mechanical activation elements having different acoustic signatures. The reference signature(s) may be stored in a database located in memory accessible to the controller of the hearing aid. Each of the reference signatures is associated with a 'ground truth' indication of the signature (signature #q), e.g. signature #1, signature #2, . . . , signature #$N_{MAE}$, where signature #q is the acoustic signature of the $q^{th}$ mechanical activation element.

Parameters that participate in the optimization (training) of the neural network may include one or more of the weight-, bias-, and non-linear function-parameters of the neural network.

In a training phase, the neural network may be randomly initialized and may thereafter be updated iteratively. The optimized neural network parameters (e.g. a weight, and a bias-value) for each node may be found using standard, iterative stochastic gradient, e.g. steepest-descent or steepest-ascent methods, e.g. implemented using back-propagation minimizing a cost function, e.g. the mean-squared error, in dependence of the neural network output and the 'ground truth' values associated with the training data. The cost function (e.g. the mean-squared error) may e.g. be computed across many training pairs of the input signals (i.e. input data and associated (expected) output).

A set of optimized parameter settings of the neural network is the parameter setting that maximize (or minimize) the chosen cost function. When the optimized parameter settings have been determined, they are stored for automatic or manual transfer to the hearing device(s), e.g. hearing aid(s) or ear phones of a headset.

An optimized set of parameters may depend on the hearing aid type (e.g. BTE or ITE). It may further depend on chosen location of the mechanical activation element.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. In the above description and the below claims, the use of an acoustic signature from an activation element, e.g. a push button, has been exemplified. Other elements having a particular signature may be envisioned, e.g. an inductive sensor may detect a distance to a metal part located in the middle of the button leading to a difference in signal strength when the button is activated (pressed down). In an inductive sensor, it is utilized that the metal in the button influences the magnetic field in a coil differently in dependence of the button being activated (pressed down) or not. When the button is activated, a part of the mass of the button is translated towards the coil, which influences the magnetic field around the coil.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. A hearing aid adapted for being worn by a user, the hearing aid comprising a housing configured to enclose components of the hearing aid, wherein the housing comprises an outer surface facing the environment and an inner surface facing the components of the hearing aid;

a forward audio signal path for receiving an audio signal, processing the audio signal and providing an output signal in dependence of said processed audio signal;

a mechanical activation element for controlling functionality of said hearing aid, wherein the mechanical activation element is located on the outer surface of said housing without penetrating said housing and emits an acoustic signature when activated; and a vibration sensor configured to pick up acoustic vibrations in air or mechanical vibrations of said housing and to provide a sensor signal indicative thereof; and a controller for analyzing said sensor signal for occurrences of said acoustic signature to thereby identify and generate a specific control input for controlling said functionality of the hearing aid.

2. A hearing aid according to claim 1 wherein the vibration sensor comprises at least one of a microphone, and an acceleration sensor.

3. A hearing aid according to claim 1 wherein the forward audio signal path comprises an input transducer for providing an electric input signal representing sound in the environment of the hearing aid;

an audio processor for processing said electric input signal and providing said processed audio signal in dependence thereof;

an output transducer for providing stimuli perceivable as sound to the user based on the processed audio signal.

4. A hearing aid according to claim 3 wherein the audio processor comprises a signature filter configured to filter the electric input signal to thereby remove the acoustic signature from the electric input signal.

5. A hearing aid according to claim 1 wherein the vibration sensor is used in the forward path for capturing sound from the environment.

6. A hearing aid according to claim 1 wherein the mechanical activation element is configured to provide an acoustic signature having its main energy in a specific frequency range.

7. A hearing aid according to claim 1 wherein the mechanical activation element is configured to provide an acoustic signature emitting an easily identifiable waveform or frequency spectrum.

8. A hearing aid according to claim 1 wherein the acoustic signature comprises at least two distinctly separable time segments.

9. A hearing aid according to claim 1 wherein the mechanical activation element is constituted by or comprises a push button.

10. A hearing aid according to claim 1 wherein the mechanical activation element is configured to provide that said acoustic signature comprise at least two distinctly separable time segments, including a first part originating from an activation and a second part originating from a release of the mechanical activation element.

11. A hearing aid according to claim 10 wherein the controller is configured to independently analyzing the at least two distinctly separable time segments and to only accept the at least two distinctly separable time segments in case both time segments are recognized and together constitute a valid acoustic signature for the mechanical activation element in question.

12. A hearing aid according to claim 1 wherein, the mechanical activation element is configured to have a resiliency providing a bistable effect whereby it after activation while in a resting state returns to its resting state after its release.

13. A hearing aid according to claim 1 wherein the sensor signal representing the acoustic signature is provided as a spectrogram to the controller.

14. A hearing aid according to claim 1 comprising a multitude of mechanical activation elements, each exhibiting different acoustic signatures and being configured to control different functionality of said hearing aid.

15. A hearing aid according to claim 1 configured to provide a feedback to the user, when a successful activation of the mechanical activation element has been accomplished.

16. A hearing aid according to claim 15 wherein the feedback to the user is made dependent on a successful detection of an expected acoustic signature by the controller of the hearing aid for the activated mechanical activation element in question.

17. A hearing aid according to claim 15 wherein the successful activation of the mechanical activation element is indicated to the user of the hearing aid as an acoustic indication via a loudspeaker of the hearing aid.

18. A hearing aid according to claim 1 wherein the controller is configured to execute a learning algorithm adapted to detect the acoustic signature emitted by the mechanical activation element; and wherein the learning algorithm comprises a neural network.

19. A hearing aid according to claim 1 being constituted by or comprising an air-conduction type hearing aid, a bone-conduction type hearing aid, a cochlear implant type hearing aid, or a combination thereof.

20. A hearing aid according to claim 1 wherein the hearing aid comprises a memory comprising one or more reference acoustic signatures, wherein the controller is configured to determine whether the acoustic signature originates from the mechanical activation element in dependence of a distance measure between the acoustic signature with the one or more reference signatures.

21. A hearing aid adapted for being worn by a user, the hearing aid comprising a housing configured to enclose components of the hearing aid;

a forward audio signal path for receiving an audio signal, processing the audio signal and providing an output signal in dependence of said processed audio signal;

a mechanical activation element for controlling functionality of said hearing aid, wherein the mechanical activation element is located on said housing and emits an acoustic signature when activated, and wherein the mechanical activation element is configured to provide that said acoustic signature comprise at least two distinctly separable time segments, including a first part originating from an activation and a second part originating from a release of the mechanical activation element;

a vibration sensor configured to pick up acoustic vibrations in air or mechanical vibrations of said housing and to provide a sensor signal indicative thereof; and a controller for analyzing said sensor signal for occurrences of said acoustic signature to thereby identify and generate a specific control input for controlling said functionality of the hearing aid.

* * * * *